United States Patent [19]
Porter

[11] 3,999,613
[45] Dec. 28, 1976

[54] TOMATO HARVESTER HEADER
[76] Inventor: Wellington W. Porter, Dublin Road, R.D. 2, Waterloo, N.Y. 13165
[22] Filed: Aug. 14, 1975
[21] Appl. No.: 604,819

Related U.S. Application Data

[63] Continuation-in-part of Ser. No. 515,851, Oct. 18, 1974, abandoned, which is a continuation of Ser. No. 311,254, Dec. 1, 1972, abandoned.

[52] U.S. Cl. .............................. 171/14; 56/327 R; 56/14.3
[51] Int. Cl.² ........................................ A01D 55/18
[58] Field of Search ............. 171/14, 27, 126, 127, 171/130, 84–107; 56/327 R, 14.3

[56] References Cited
UNITED STATES PATENTS

| | | | |
|---|---|---|---|
| 2,648,942 | 8/1953 | Grant et al. | 56/14.3 |
| 3,295,301 | 1/1967 | Looker | 56/327 R |
| 3,330,363 | 7/1967 | Greedy | 171/1 |
| 3,340,935 | 9/1967 | Csimma | 171/14 |
| 3,399,520 | 9/1968 | Porter | 56/327 R |
| 3,473,613 | 10/1969 | Boyce | 171/14 |

*Primary Examiner*—Russell R. Kinsey
*Attorney, Agent, or Firm*—Charles S. Mc Guire

[57] ABSTRACT

A header section for a tomato harvester wherein a pair of counter-rotating discs are moved along a row of tomato plants with the forward edges below ground level to pick up plants, loose fruit and soil and deliver them to a pick-up conveyor. A first aspect of the invention is concerned with a novel structure of the disks and associated structure whereby plant stems are engaged by the disks, moved rearwardly and pulled upwardly to sever the plant from the roots by pulling and breaking rather than cutting. A second aspect of the invention resides in the resilient coupling of the pick-up conveyor, upon which the header section is mounted, to the rigid main frame.

10 Claims, 13 Drawing Figures

TOMATO HARVESTER HEADER

REFERENCE TO RELATED APPLICATIONS

The present application is a continuation-in-part of U.S. application Ser. No. 515,851, filed Oct. 18, 1974, which was a continuation of U.S. application Ser. No. 311,254 of the same inventor, filed Dec. 1, 1972, both said prior applications being now abandoned.

BACKGROUND OF THE INVENTION

This invention relates to crop harvesting machinery and, more particularly, to harvesting of fruits or vegetables growing at or near ground level, or on low plants, in spaced, individual rows.

Special machinery has been developed to automatic partially or fully the harvesting of many different types of food crops. Often such machinery is unique to a particular crop, being especially tailored to the harvest of one type of produce and unsuited for use with any others. While the present invention is disclosed in connection with the harvesting of tomatoes, it may also be employed in the harvest of other crops planted in spaced rows particularly those growing above or slightly below ground level.

Harvesting machines have been previously used which sever the main stems of plants at or near ground level and transport the vine with the fruit or vegetable attached to a station for separation thereof. Severing means used have included rotatable discs with cutting edges, and conveyors of belt, chain or other types have been used for transporting the produce through various processing operations or directly to containers for storage or shipment.

With crops such as tomatoes there is a special problem in machine harvesting since the fruit must be protected against rough handling which could cause crushing or bruising. In general, harvesting machinery for crops of this type represents some compromise between sturdy or economical apparatus which may damage the produce, and machinery which handles the fruit or vegetables carefully but is proportionately more complicated, expensive and fragile. An associated problem is the tendency of the machine to become clogged with the vines of the crop being harvested, or with weeds or other foreign materials.

It is a principal object of the present invention to provide harvesting apparatus which allows automated gathering of crops growing above or close to ground level without substantial damage to relatively fragile fruit, while being simple and economical as well as durable and reliable in operation.

A further object is to provide a novel and improved means for harvesting tomatoes by severing the plants one row at a time and transporting the fruit laden vines to a separating station.

Still another object is to provide apparatus for digging crops growing a short distance below ground level and loading them on conveyor means for automated pick-up and handling in an improved manner which substantially reduces the liklihood of the machine becoming clogged.

A still further object is to provide harvesting apparatus of the type having a section for picking up the crops from ground level and a further section for additional harvesting operations wherein the two sections are coupled in a manner providing improved operation.

An additional object is to provide a tomato harvesting machine of improved efficiency in picking up and retaining a high percentage of the crop.

Further objects will in part be obvious and will in part appear hereinafter.

SUMMARY OF THE INVENTION

The invention comprises novel apparatus for one-row crop harvesting, gathering and transporting fruit, vegetables, or crop bearing plants to a station where the fruit or vegetables are separated from foreign matter. A pair of counter-rotating disks are supported in side-by-side relation with their adjacent edges overlapping. The disks are tilted forward so that the leading edges are below ground level as they are moved along the row, thereby lifting a layer of soil and moving it rearwardly over the adjacent portions of the disks. The discs are provided with a series of notches of unique shape, separated by portions of the circular peripheral edges of the discs. Means, in the nature of dome-shaped elements, are provided in association with the disks for laterally constraining the soil and tending to compress it into a moving bed, which is delivered to the lower end of the inclined pick-up conveyor. The structure and relative positioning of the discs are such that plant stems are severed due to the shape and arrangement of the notches, and the discs themselves. The stems are severed after traveling a significant portion of the distance through the overlapped area of the disks by the upward pull exerted by the arrangement of the disks, sloping upwardly toward the rear edges. As the stems are severed the plants are separated from the roots and transported rearwardly upon the moving bed of soil. The fruit, vegetables and/or plants are deposited by the disks on a conveyor chain which allows the soil to fall through, leaving only the plants and fruit, which are then separated from one another.

The header section, comprising the disks and their supporting structure, is mounted on the wheeled pick-up conveyor section which is coupled by resilient means to the main frame. The pick-up conveyor section, while being urged to an aligned position with respect to the main frame, is free to move pivotally with respect thereto, allowing the header section to follow more closely the ground contour at the point of crop contact. The resilient coupling feature of the invention may also be employed in harvesting crops growing in spaced rows a short distance below the ground, such as beets, turnips, and the like. Such crops are dug up by the counter-rotating disks and the soil which is dug up with them serves as a moving bed transporting the vegetables over the blades and to the open conveyor chain which separates the vegetables from the dirt and rocks.

BRIEF DESCRIPTION OF THE INVENTION

DETAILED DESCRIPTION

Figure 1:
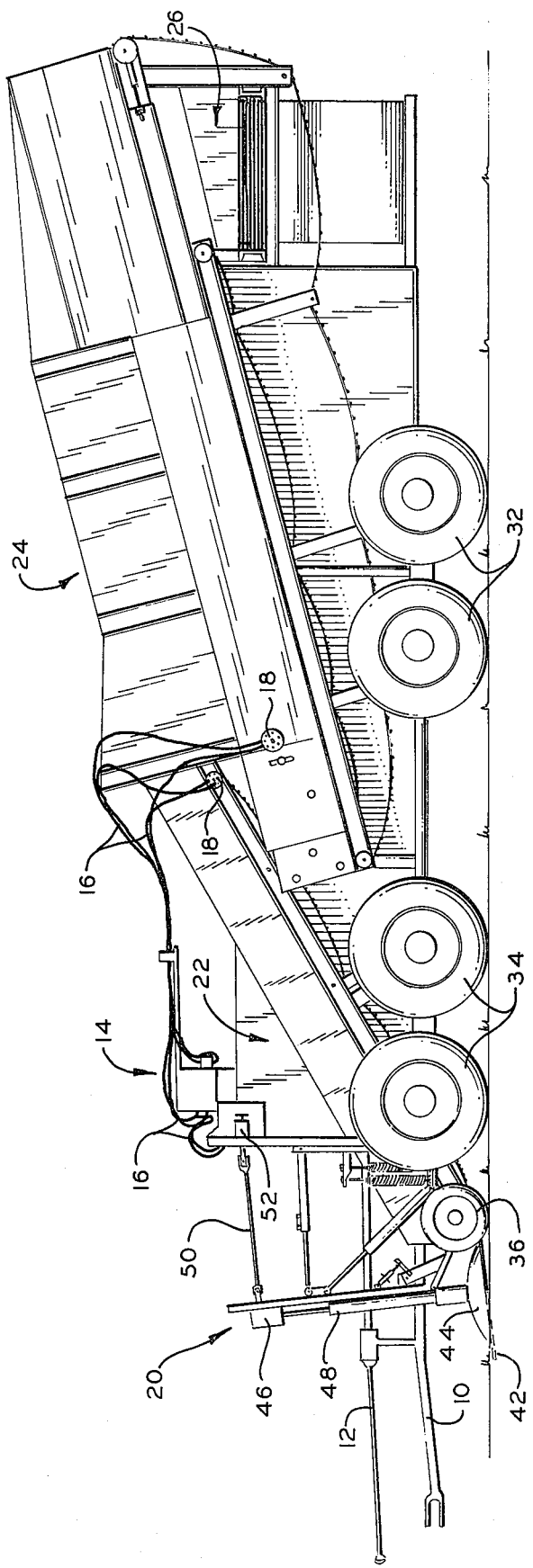
FIG. 1 is an elevational view of one side of the harvesting apparatus.
Figure 2:
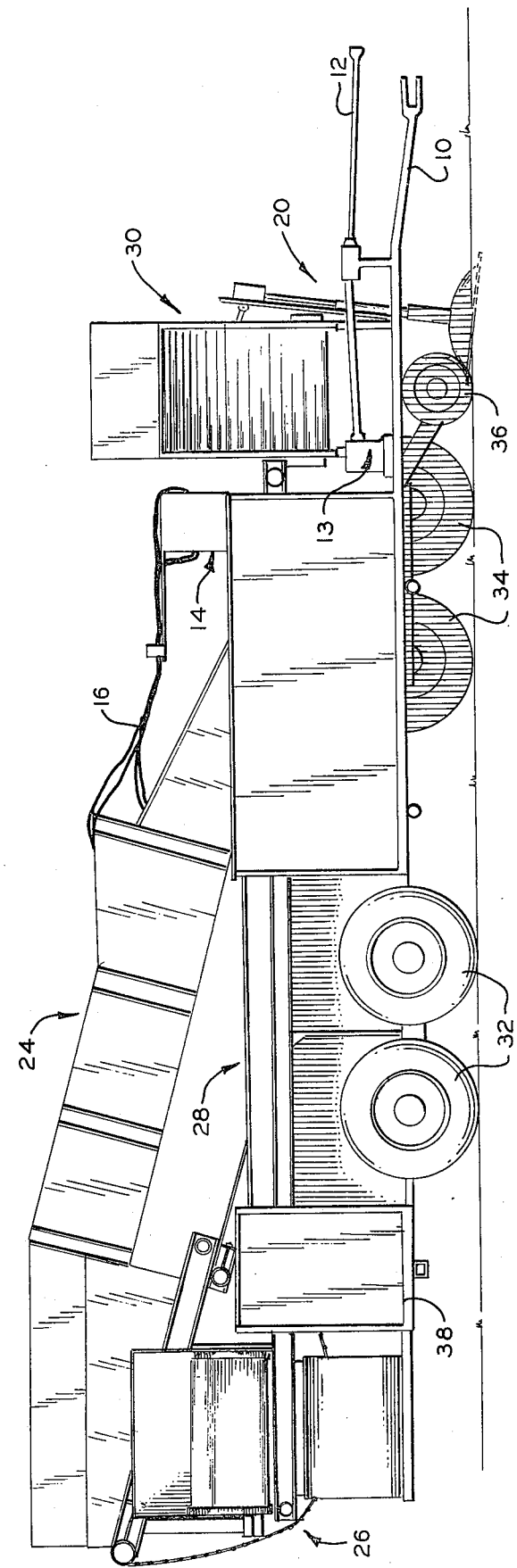
FIG. 2 is an elevational view of the opposite side.

In the disclosed form, the apparatus is propelled and powered by an external source, such as a tractor, but a suitable engine, steering mechanism, etc., could be incorporated, if desired, to make the machine self-propelled. Tongue 10 extends from the main frame of the harvesting machine for attachment in the usual manner to a tractor draw bar. Power take-off drive shaft 12 is connected to the tractor P.T.O. unit to transmit the necessary power to the main hydraulic system, denoted generally by reference numeral 14, through transfer mechanism 13, by conventional power transmission couplings. The harvesting machine is equipped in conventional fashion with adjustable slip clutches, relief valves and other such power transmissions safety devices. Hydraulic lines 16 lead from the manifold, through selectively controlled valves (not shown), to a plurality of hydraulic motors 18 which drive various individual conveyors and other moving parts, as described in more detail.

Figure 3:
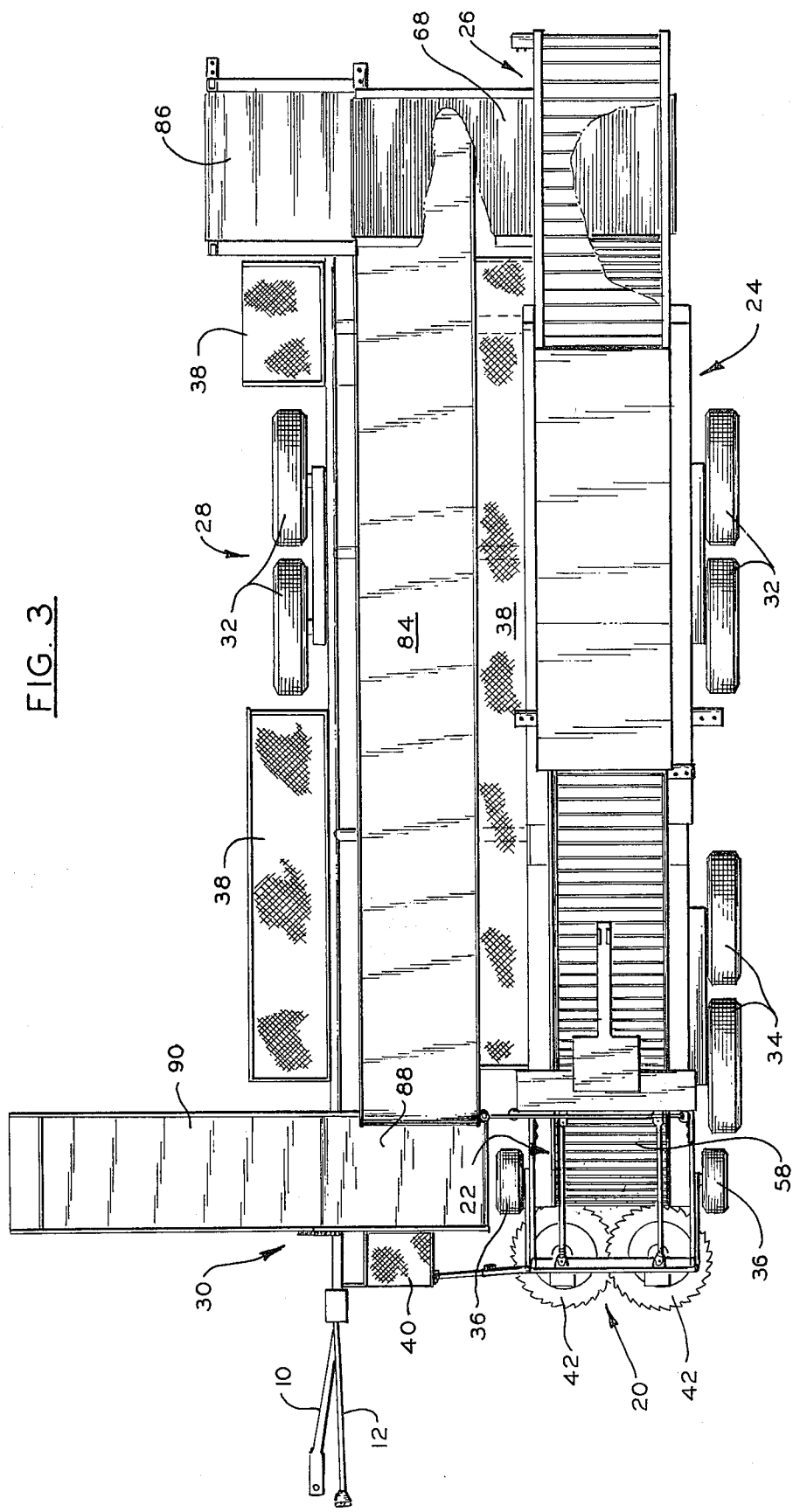
FIG. 3 is a top plan view of the apparatus.

The machine generally comprises header section 20, with which the present invention is principally concerned, feeder section 22, shaker section 24, rear lateral conveyor section 26, sorting section 28, and discharge section 30, all of which may be seen in FIG. 3. The main frame of the machine is supported for movement on wheels 32, a pair of tandem wheels 34 are provided to support feeder section 22, and a smaller pair of wheels 36 adjustably support header section 20. Platforms 38 are affixed to the frame to support several workers on each side of sorting section 28, and platform 40 is provided for the supervisor of the sorting crew at the head of this section. Manual controls for the aforementioned valves controlling hydraulic motors 18 are preferably located for easy access by the supervisor standing on platform 40. A canopy (now shown) may be mounted in covering relation to the sorting section to protect workers from sun and rain.

Header section 20 is designed to sever plant stems approximately at ground level and deliver them, with the fruit or vegetables intact, to feeder section 22. A pair of disks 42 having notched peripheral edges, as explained in detail later herein, are supported in side-by-side relation with their adjacent edges overlapping. Dome-shaped elements 44 are provided on the upper surfaces of disks 42 and cover a substantial portion thereof. The disks and dome-shaped elements are fixedly supported on the ends of rotatable shafts extending from gear boxes 46 through sleeves 48. Drive shafts 50 are powered by hydraulic pumps 52 and transmit rotation to the disks in opposite directions so that the leading edges of the disks move toward one another.

Figure 8:
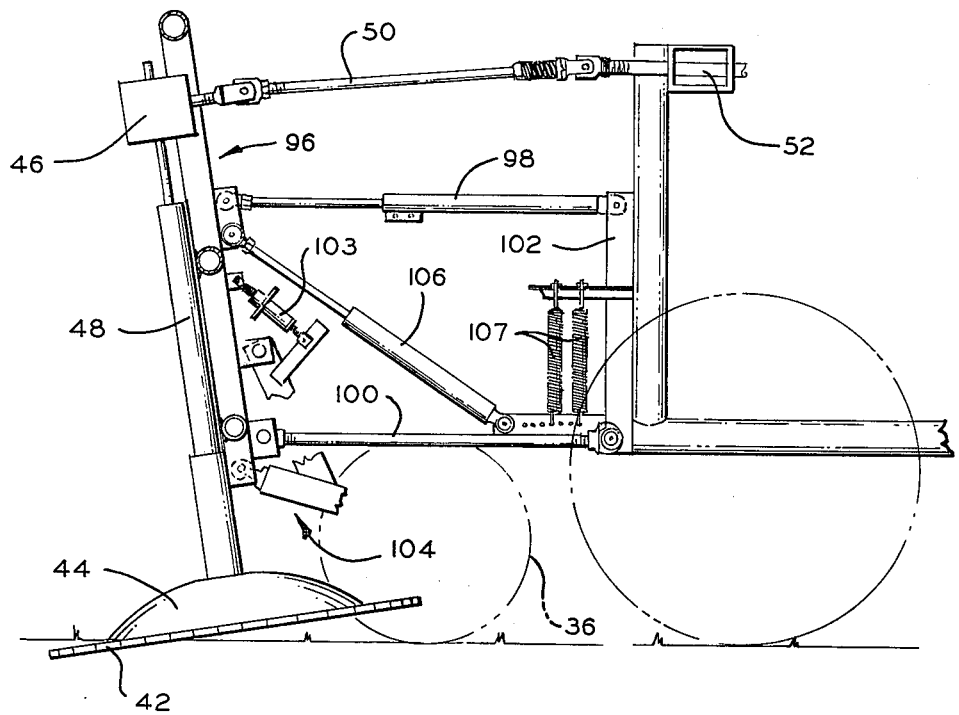
FIG. 8 is a fragmentary, side elevational view of the forwardmost part of the apparatus.

It will be noted from FIGS. 1 and 8 that sleeves 48 and the rotatable shafts therein, which are concentric with the axes of discs 42, are tilted slightly forward so that the disks slope upwardly from their leading edges. Adjustable support mechanism described later in more detail maintains the leading edges of disks 42 at a desired vertical position, preferably a short distance below the surface of the soil over which the machine is traveling. Thus, as the machine is moved along a row of tomatoes, with the main stems of the plants substantially in a line with the overlapped portions of the disks, a layer of soil is lifted and moved rearwardly across the central portions of the disks. Also, the stems are severed substantially at ground level as they are engaged between the upwardly sloping, counter-rotating edges of disks 42. Since the edges of the discs are blunt, and since the stems of the matured plants are quite tough, the stems are firmly engaged between the disks, but are not immediately cut off. The severing action is produced by the engagement of the stem between the disks combined with the upward pull exerted by the disks as the engaged portion of the stem travels rearward relative thereto. That is, the disks are arranged with their adjacent side edges overlapping and with their rear edges higher than the front edges at which the stems are initially engaged, thereby producing combined pulling and shearing forces on the stem.

This action combines with the lateral constraining and compacting function of domes 44 to contribute greatly to the ability of the machine to operate without clogging and with minimum droppage, i.e., failure of the machine to pick up any crops. Since the plants have already advanced a significant distance rearwardly on the disks by the time the stems are severed from the roots, there is much less tendency for the plants or fruit to be thrown outwardly by the disks and thus fail to be picked up by the harvester. Also, if the plants are severed, and therefore lying free on the disks, at or near the point where the forward edges meet, they are more likely to spin around and become entangled with the disk drive shafts or the lateral constraining members. This is especially evident in prior art harvesting apparatus wherein the lateral constraining means are structurally independent of the disks. In the present apparatus, wherein the dome-shaped elements which provide the lateral constraining and compacting function are rotated integrally with the disks, together with the severing action which provides for movement of the plants a significant distance rearwardly on the disks before being freed from the roots, the plants, weeds or other foreign material are much less likely to cause clogging of the machine.

Disks 42 may likewise be used for digging crops growing a short distance below ground level, such as beets, turnips and some varieties of onions, as well as crops which have previously been dug or plowed in rows e.g., sweet potatoes. This action is shown and described in greater detail in connection with later figures.

Figure 6:
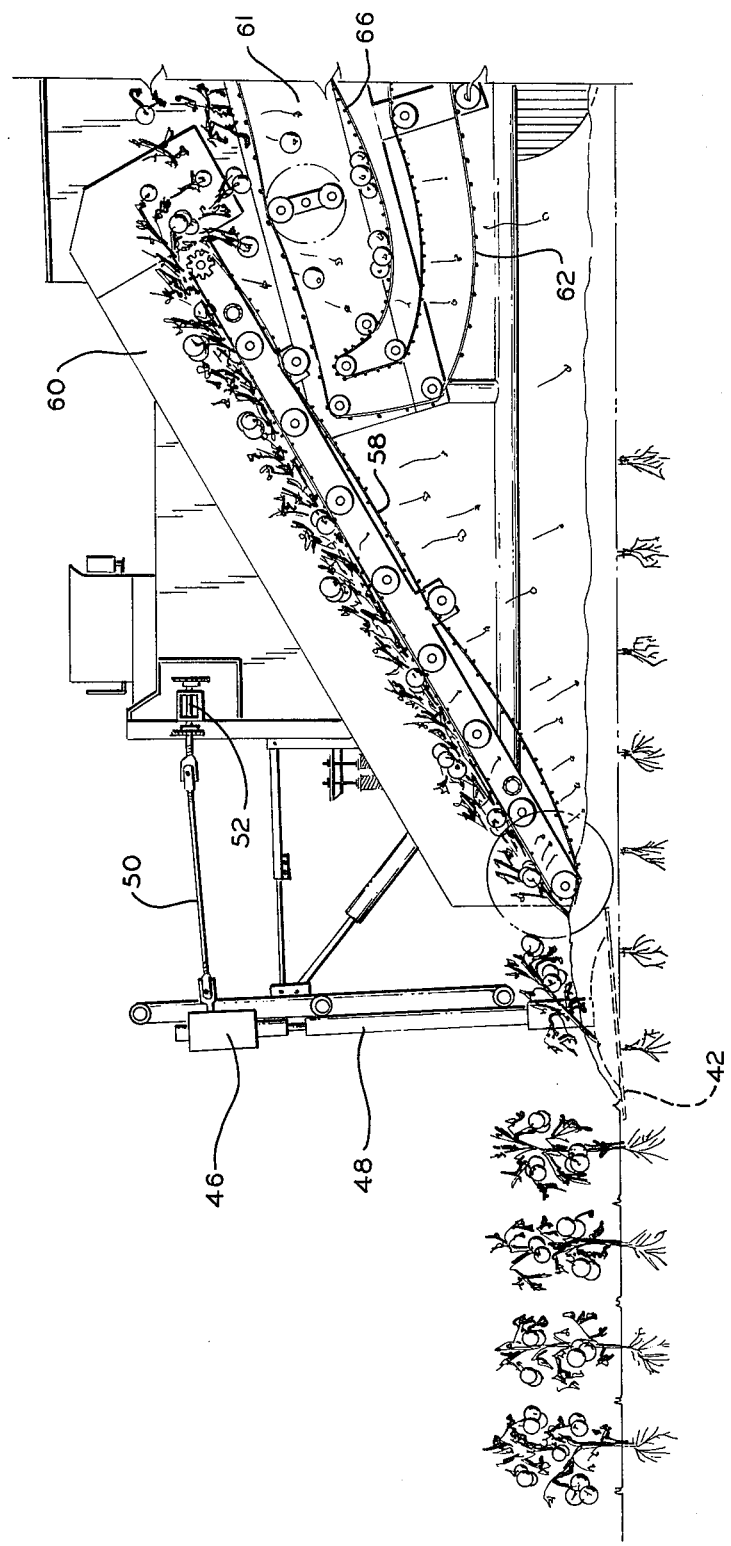
FIG. 6 is a fragmentary side elevational view of the forward portion of the apparatus in section on the line 6—6 of FIG. 4.

From header section 20, the soil, together with the crops and plants are discharged toward feed section 22. As best seen in FIG. 6, the lower end of inclined pick-up conveyor 58, preferably of the "potato chain" type, is positioned directly behind the trailing edges of disks 42, directly in the path of the soil moving thereover. Conveyor 58 is provided with side shields 60, and the usual sprockets, idler rolls, and power means (one of hydraulic motors 18) for imparting rotation in the proper direction. The soil and fruit-laden plants are discharged from the trailing edges of disks 42 onto the lower end of conveyor 58 with all or most of the soil falling off the disks or through the conveyor chain. The plants are transported upwardly and rearwardly on conveyor 58 and fall off the upper end to shaker section 24 where the fruit and vines are separated.

Shaker section 24 includes two continuous belts, one completetly within the other, between side shields 61. Outer or shaker belt 62, as seen in FIG. 6, receives the plants from feeder section 22 and is oscillated to shake the tomatoes loose from the vines. Belt 62 is formed of widely spaced links so that tomatoes may fall through as they become separated while the vines, in general being larger than the fruit, tend to remain on the shaker belt until they fall off at the rearmost part of the machine where shaker belt 62 passes around sprocket 64 and begins its downward travel. Inner or catcher belt 66 is formed of more closely spaced links so that tomatoes which fall through belt 62 are retained on the upper surface of this belt and transported to the upper end thereof where they fall onto rear lateral conveyor belt 68.

Figure 7:
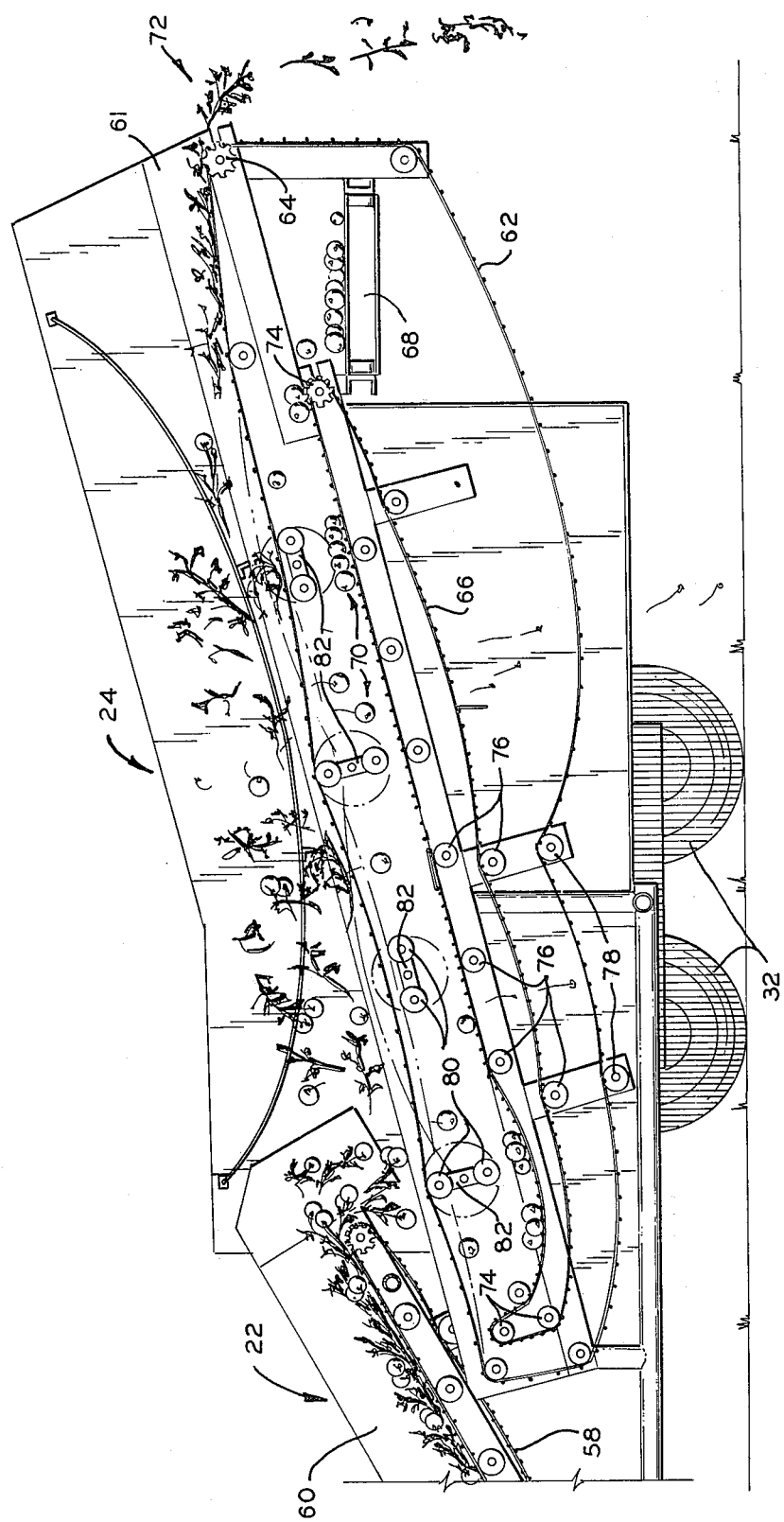
FIG. 7 is a view similar to FIG. 6 of the portion of the apparatus rearward thereof.

The tomatoes falling throgh shaker belt 62 to catcher belt 66 are indicated generally in FIG. 7 by reference numeral 70. The vines from which the tomatoes have been removed and which are being discharged from the rear of the machine are indicated by numeral 72. Belt 66 passes around sprockets 74, one or more of which is powered by one of hydraulic motors 18 to drive the belt in the proper direction at the desired speed, and intermediate idlers 76. Belt 62 passes over idlers 78 in the lower portion of its travel, and over idlers 80 on rotating shaker arms 82 in the upper portion. Details of suitable structure for imparting motion to belt 62 to dislodge the tomatoes from the plants is explained more fully in U.S. Pat. No. 3,810,512, of the same inventor.

Figure 5:
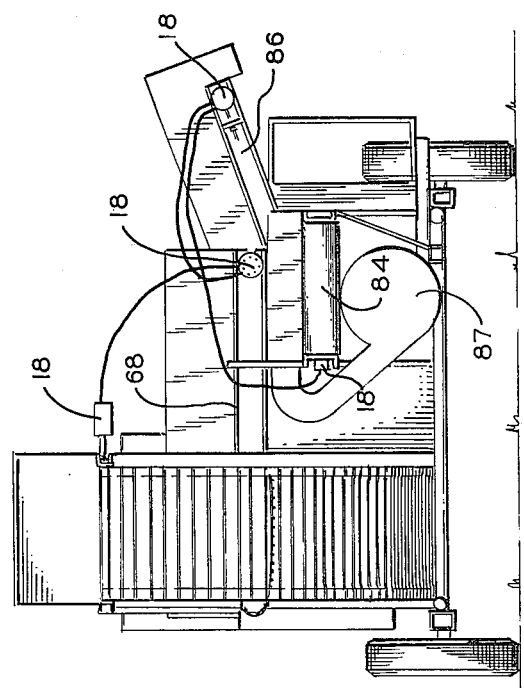
FIGS. 4 and 5 are front and rear views, respectively, of the same apparatus.

The tomatoes are transferred from belt 66 to sorting section 28 by rear lateral conveyor section 26. It will be noted in FIG. 7 that the end of belt 68 of section 26 which receives the fruit from belt 66 is likewise encircled by belt 62. Belt 68 is also a potato chain or other such open, continuous belt, and transports the fruit across the rear of the machine. As shown in FIG. 5, the fruit drops from belt 68 to sorting belt 84 near the lower end of inclined conveyor 86. Although the bulk of the vines and plants are discharged from the rear of the machine by shaker belt 62, some of the smaller pieces will fall through with the fruit and be transferred therewith to belt 68. As the tomatoes and pieces of plants fall from belt 68, the angle of elevation of conveyor 86 is such that the fruit will roll off the lower end thereof onto sorting belt 84. The pieces of plants, however, being lighter and less likely to roll or slide off, will be transported upwardly by the belt of conveyor 86, of solid rather than open link chain type, and discharged toward the side of the machine. To assist in the separation of plant fragments and other light foreign matter from the fruit at this point, blower 87 is arranged to direct an air stream across the path of material being discharged from belt 68, as also seen in FIG. 5.

The fruit deposited on sorting belt 84 is thus relatively free of plant pieces, rocks and the like. The sorting belt is of the solid type and horizontally disposed to transport the fruit from the rear toward the front of the machine. As previously mentioned, workmen are stationed along each side of the sorting belt on platform 38. As the fruit travels along on the sorting belt it is visually inspected and any unwanted fruit, together with any remaining foreign matter, is manually removed and thrown back into the field. Thus, only the tomatoes to be commercially used are transferred from sorting section 28 to discharge section 30.

Figure 4:
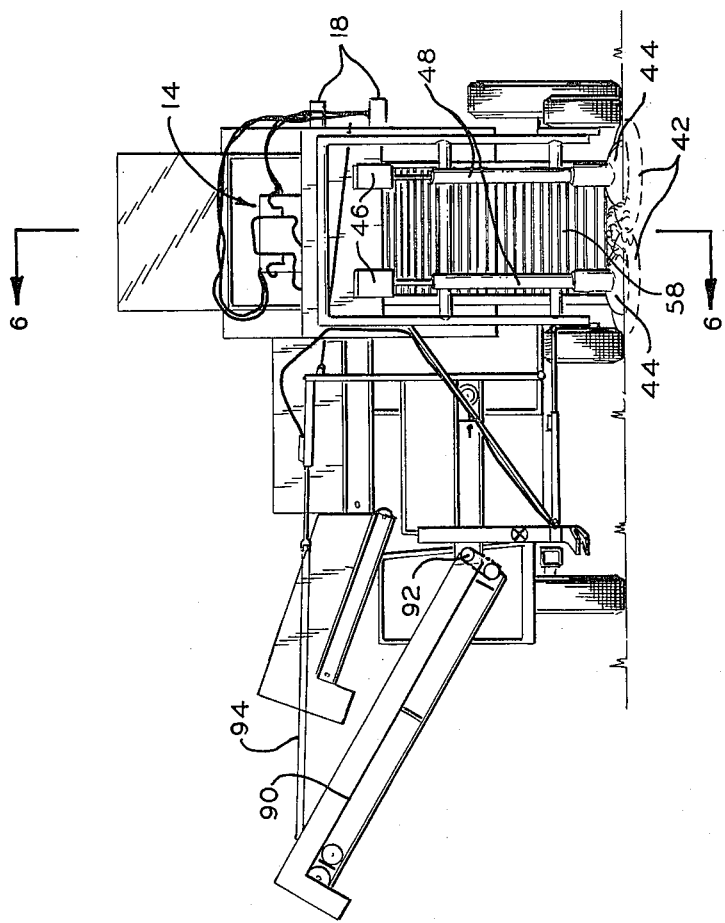

The discharge section is laterally disposed in order to discharge fruit from the side of the machine. From sorting belt 84, the fruit is deposited on a short, horizontally disposed belt 88, from which it is transferred to upwardly inclined belt 90 (FIG. 3). The latter forms a portion of the final discharge conveyor which is pivoted to the frame at 92 (FIG. 4) and supported by adjustable arm 94. The position of the top end of the final discharge conveyor may thus be selectively adjusted for discharging the produce to an adjacent vehicle, or other receiving means. Both belts 88 and 90 are of the solid type, as seen in FIG. 3.

Turning now to FIG. 8, various elements of the header section are shown in greater detail. Sleeve 48 is fixedly attached to horizontal elements of header support frame 96 which is supported by upper and lower rods 98 and 100, respectively, attached at their opposite ends to portion 102 of the rigid main frame. Blade 42 is closely seen tilted forward with its frontmost edge under the surface of the ground. The desired angle of tilt may be set by adjustment of screw jack 103, having one end attached to frame 96 and the other to a fixed support bracket.

Wheels 36, one of which is shown in phantom lines in FIG. 8 are supported on mechanism attached to support frame 96. The wheel support mechanism is indicated generally by reference numeral 104 and is adjustable to govern the depth of cut of disks 42. Hydraulic cylinder 106 is selectively actuable to raise and lower the entire header assembly, including wheels 36, relative to the main frame of the harvesting apparatus. Springs 107 assist in supporting the weight of the forward portion of the header section.

Figure 9:
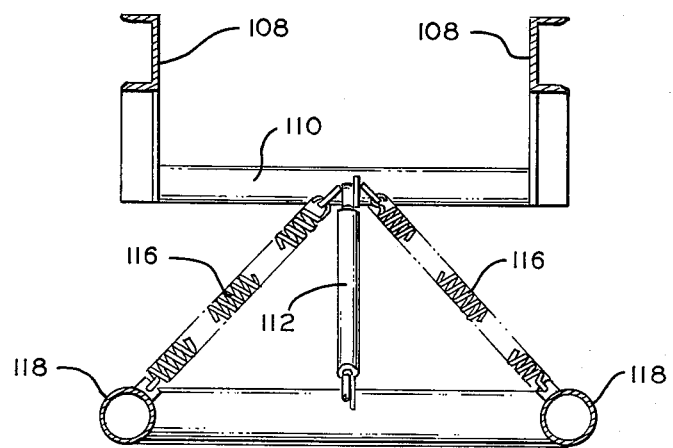
FIG. 9 is a fragmentary, sectional view in section substantially on the line 9—9 of FIG. 6.

In FIG. 9 is shown the stabilizing mechanism providing a resilient coupling between the rigid main frame and feeder or pick-up section 22, upon which header section 20 is mounted. Channel members 108 carry, on their facing surfaces, the idler rolls and sprockets for conveyor 58. The channel members are rigidly affixed to cross support 110. Stabilizer bar 112 extends between pivotal or universal-type connections with cross support 110 and the main support frame. Centering springs 116 are connected between support 110 and outer portions 118 of the main frame. The connection allows relative movement between the pick-up section and main frame of the apparatus, thus allowing the disks of the header section, as well as the pick-up section to follow closely the ground contour irrespective of the position of the main frame.

Figure 10:
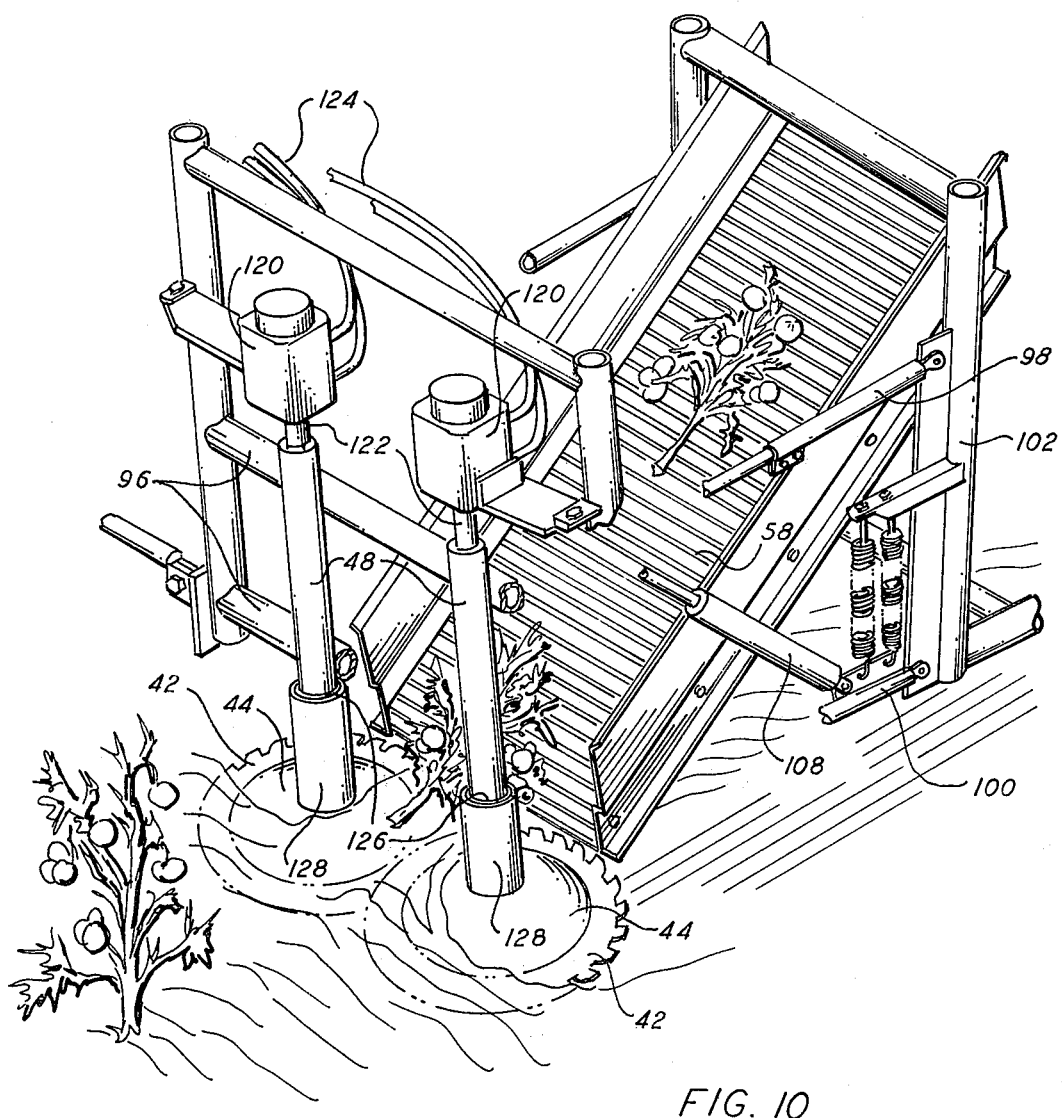
FIG. 10 is a fragmentary, perspective view of the preferred embodiment of the header section of the apparatus.
Figure 11:
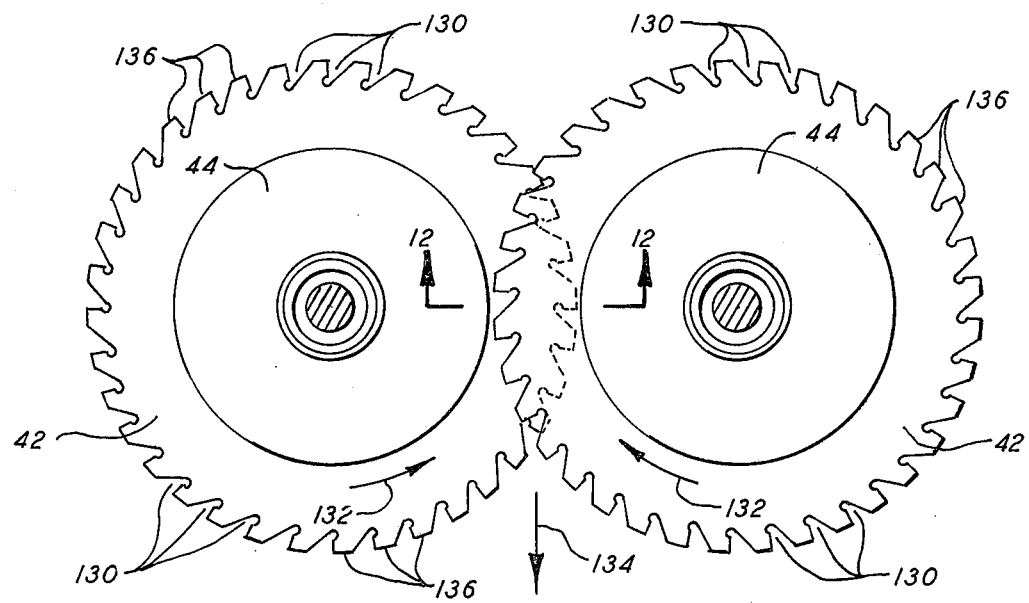
FIG. 11 is a plan view of the overlapped discs shown in FIG. 10.
Figure 11A:
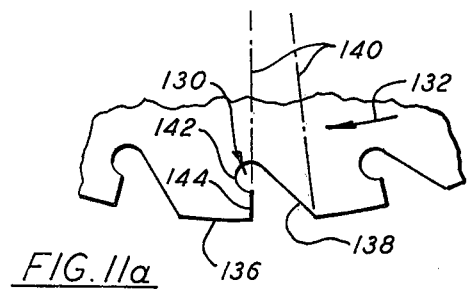
FIG. 11a is an enlarged plan view of a fragment of the periphery of one of the discs.
Figure 12:
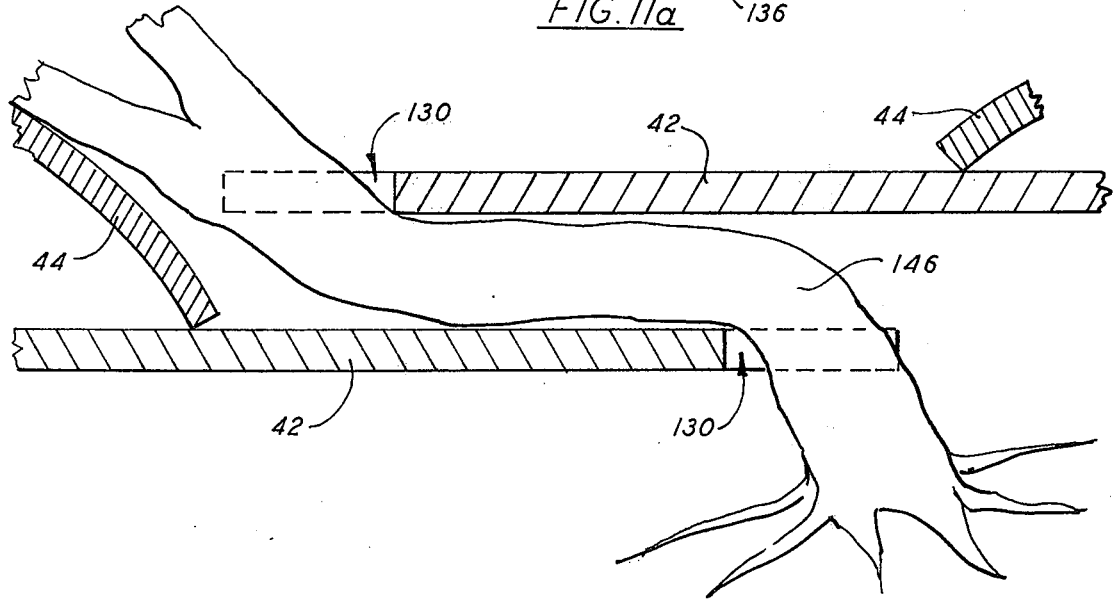
FIG. 12 is an enlarged sectional view taken on the line 12—12 of FIG. 11.

The nature and operation of the header section can perhaps best be seen with reference to FIGS. 10–12 showing portions of the header section and, in particular, the rotating discs. The drive mechanism shown in FIG. 10 is somewhat simplified and is preferred over that indicated in previous FIGURES. That is, elements such as gear boxes 46, drive shafts 50, etc., have been eliminated and hydraulic motors 120 are connected directly to the upper ends of parallel shafts 122 to impart rotation thereto. Shafts 122 extend through stationary sleeves 48, as in the previously described construction, discs 42 and domes 44 being affixed to the lower ends of shafts 122 for rotation therewith. Hydraulic lines 124 supply pressurized fluid from the pumps to power motors 120. Other elements of the header and feeder sections shown in FIG. 10 are the same as in the previous construction and are indicated by the same reference numerals. The outer surfaces of rotating tubes 126, also attached to the lower ends of shafts 122 for rotation thereby and encircling the lower ends of stationary sleeves 48, are preferably covered with rubberized material 128, diamond-tread belt, or other high traction surface, to assist in engaging and moving the plants and soil rearwardly.

In FIG. 12, the entire periphery of each of discs 42 is seen to have formed therein a succession of notches 130 which are generally inclined in the direction of rotation of the discs, indicated by arrows 132. The direction of movement of the machine is indicated by arrow 134. The notches are spaced so that edges 136, representing portions of the circular disc peripheries, are provided between each notch. The discs are overlapped at their adjoining edges to such an extent that the outer periphery of the upper disc closely approaches the adjacent dome. The precise shape of the notches 130 may be seen more clearly in the fragment of FIG. 12a. A first edge 138 of each notch extends inwardly from peripheral edge 136 inclined in the direction of rotation with respect to a radial line of the disc, indicated by line 140. From substantially straight edge 138, notches 130 are formed with a generally rounded edge 142 and return to meet the disc periphery with a second substantially straight edge 144.

The purpose of this notch configuration is to enhance the ability of the discs to engage plant stems without severing them to detach the plant from the roots until the plant has moved relative to the discs to a position well rearward thereon. As shown in the enlarged and somewhat exaggerated sectional fragment of FIG. 12, plant stem 146 is engaged between the overlapped portions of discs 42 which are spaced apart by a distance preferably about ⅜ to ½ inch. Although the stem of every plant harvested will not necessarily be engaged in notches 130 in both of discs 42, most plants will be engaged in at least one notch, the circular edged portion of the notches serving as a recess in which the stems tend to be maintained. At any rate, the edges of discs 42, both within notches 130 and on peripheral edges 136, are blunt and do not significantly tend to cut the stems. Instead, the stems are severed near root level by the pulling action of the upwardly sloping discs while being firmly engaged therebetween.

Discs 42 are made of heavy guage metal, but are flexible in the peripheral areas outside domes 44 to further enhance their ability to engage and pull plant stems without cutting them. Notches 130 are preferably about 1½ inch in width at the periphery of the discs and are spaced by about 1 inch, thus providing about 38 notches in a disc 30 inches in diameter, which is the approximate preferred size, although other appropriate sizes may, of course, be used.

What is claimed is:

1. Apparatus for movement through a field to assist in crop harvesting comprising:
 a. a frame mounted for movement over the ground;
 b. a pair of substantially flat, circular disks arranged in side-by-side relation with overlapping edges for rotation about substantially parallel axes through the center of said discs;
 c. support means operatively connected to said support frame maintaining said disks with their forward and rearward edges, with respect to the direction of movement of the apparatus, respectively below and above ground level, said axes being tilted forwardly from the top by an acute angle with respect to the vertical;
 d. a pair of dome-shaped elements concentrically arranged about said axes and sloping downwardly therefrom to the upper surface of said disks, said elements covering a substantial portion of said upper surfaces and mounted for rotation with said disks;
 e. power driven means imparting rotation through said support means to said disks in opposite directions with said forward edges moving toward one another, whereby a layer of earth is lifted by said forward edges and moved rearwardly upon said disks, the height of said dome-shaped elements being such that said layer of earth and material carried thereon are laterally constrained and compacted by said dome-shaped elements;
 f. a plurality of evenly spaced notches extending into the peripheries of each of said discs and inclined generally in the intended direction of rotation, said notches being spaced to provide an edge of the circular disc periphery therebetween, whereby the stems of plants are engaged between said discs and pulled upwardly and rearwardly to be served from the roots, each of said notches including:
  i. a first straight edge extending inwardly from a first point on the disc periphery at an angle to the radius inclined in the direction of rotation;
  ii. a rounded edge extending from the inner terminus of said first edge in the direction or rotation; and
  iii. a second straight edge extending from the terminus of said rounded edge to a second point on said disc periphery.

2. The invention according to claim 1 wherein the length of said edge of the circular disc periphery between each of said notches is not greater than the width of said notches at the disc periphery.

3. The invention according to claim 1 wherein the length of said edge of the circular disc periphery between each of said notches is not greater than the distance between said first and second points.

4. The invention according to claim 1 wherein the lower surface of the upper disc, in the area where said discs are overlapped, is normally spaced approximately ½ inch from the upper surface of the lower disc.

5. Harvesting apparatus for tomatoes, and the like, comprising:
 a. a forwardly disposed header section adapted to sever plants, and direct plants and fruit rearwardly;
 b. a wheel supported feeder section upon which said header section is supported and including conveyor means adapted to receive thereon plants and fruit directed rearwardly by said header section;
 c. a shaker section adapted to separate the vines and fruit;
 d. a rigid main frame upon which said shaker section is supported;
 e. a plurality of wheels upon which said main frame is mounted for movement over the ground;
 f. resilient means coupling said feeder section to said frame, whereby said feeder section is movably supported with respect to said main frame; and
 g. opposed biasing means yielding urging said feeder section toward a position in alignment with said shaker section.

6. The invention according to claim 5 wherein said resilient means comprises a bar pivotally connected at opposite ends between frame members of said feeder section and said main frame.

7. The invention according to claim 6 wherein said opposed biasing means comprises a pair of springs.

8. The invention according to claim 7 wherein said springs are both connected at one end of each substantially at the connection of said bar to said feeder section, and at the other ends of each at widely spaced points on opposite sides of the connection of said bar to said main frame.

9. In a tomato harvesting machine of the type movable through a field to remove plants and fruit from the ground, a header construction for mounting at the forward end of the machine to sever plant stems and direct plants and fruit onto the machine, said header construction comprising:
   a. a pair of substantially flat, circular disks arranged in side-by-side relation with overlapping edges for rotation about substantially parallel axes through the center of said discs;
   b. power drive means imparting rotation to said disks in opposite directions with the forward edges thereof, with respect to the intended direction of movement of the harvester, moving toward one another; and
   c. a plurality of evenly spaced notches extending into the peripheries of each of said discs and inclined generally in the intended direction of rotation, said notches being spaced to provide an edge of the circular disc periphery therebetween, whereby the stems of plants are engaged between said discs and pulled upwardly and rearwardly to be severed from the roots, each of said notches including:
      i. a first straight edge extending inwardly from a first point on the disc periphery at an angle to the radius inclined in the direction of rotation;
      ii. a rounded edge extending from the inner terminus of said first edge in the direction of rotation; and
      iii. a second straight edge extending from the terminus of said rounded edge to a second point on said disc periphery.

10. The invention according to claim 9 wherein the length of said edge of the circular disc periphery between each of said notches is not greater than the distance between said first and second points.

* * * * *